(12) United States Patent
Knoell

(10) Patent No.: US 10,260,647 B2
(45) Date of Patent: Apr. 16, 2019

(54) VALVE WITH A CONTROL SPACE VENTED VIA A SEALING GROOVE

(71) Applicant: Robert Bosch GmbH, Stuttgart (DE)

(72) Inventor: Burkhard Knoell, Burgsinn (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 15/642,601

(22) Filed: Jul. 6, 2017

(65) Prior Publication Data

US 2018/0010700 A1    Jan. 11, 2018

(30) Foreign Application Priority Data

Jul. 6, 2016 (DE) .......................... 10 2016 212 311

(51) Int. Cl.
*F16K 11/07* (2006.01)
*F16K 31/122* (2006.01)
(Continued)

(52) U.S. Cl.
CPC ........ *F16K 11/0712* (2013.01); *F15B 13/042* (2013.01); *F16K 31/1221* (2013.01);
(Continued)

(58) Field of Classification Search
CPC . F15B 13/042; G05D 16/106; F16K 11/0712; F16K 31/1221; F16K 31/1223;
(Continued)

(56) References Cited

U.S. PATENT DOCUMENTS 4,414,882 A * 11/1983 Frei ..................... F16K 31/1221
251/25
6,065,487 A * 5/2000 Watson ................. F16K 31/426
137/271

FOREIGN PATENT DOCUMENTS

DE        1 245 244 A     7/1967
DE      197 15 020 A1    10/1998
(Continued)

OTHER PUBLICATIONS

Bosch Rexroth AG, RE 64322 Product Sheet, Flow sharing control block in mono block/sandwich plate design M6-22, Edition: Dec. 2015, Bosch Rexroth AG, Mobile Applications, Lohr am Main, Germany.

*Primary Examiner* — Kevin F Murphy
*Assistant Examiner* — Kelsey E Cary
(74) *Attorney, Agent, or Firm* — Maginot, Moore & Beck LLP

(57) ABSTRACT

A valve includes a basic body, control spool, sealing ring, and control cover. The control spool is received in the basic body to be movable along a longitudinal axis. The basic body includes a counter-sealing surface, connecting channel, and tank channel having at least one first annular groove surrounding the control spool. The control cover and at least one end face of the control spool facing toward the longitudinal axis delimits, at least in part, a control space. The control cover includes a sealing surface that abuts the counter-sealing surface of the basic body. At least one of the sealing surface and the counter-sealing surface includes a sealing groove that surrounds the control space in ring-like fashion. The sealing ring is received in the sealing groove. The connecting channel opens out into the tank channel and into the sealing groove.

12 Claims, 2 Drawing Sheets

(51) Int. Cl.
*F15B 13/042* (2006.01)
*G05D 16/10* (2006.01)
*F16K 31/124* (2006.01)
*F15B 13/04* (2006.01)
*F15B 21/044* (2019.01)

(52) U.S. Cl.
CPC ...... *F16K 31/1223* (2013.01); *F16K 31/1245* (2013.01); *G05D 16/106* (2013.01); *F15B 13/0402* (2013.01); *F15B 21/044* (2013.01); *Y10T 137/8671* (2015.04)

(58) Field of Classification Search
CPC .... F16K 31/1245; F16K 27/041; F16K 27/12; Y10T 137/8671; Y10T 137/86694; Y10T 137/86582; Y10T 137/86574
USPC ................ 137/625.69, 625.67, 625.2, 625.6
See application file for complete search history.

(56) References Cited

FOREIGN PATENT DOCUMENTS

DE   10 2006 007 935 A1   10/2007
DE   10 2012 222 399 A1   6/2014

\* cited by examiner

VALVE WITH A CONTROL SPACE VENTED VIA A SEALING GROOVE

This application claims priority under 35 U.S.C. § 119 to patent application no. DE 10 2016 212 311.4, filed on Jul. 6, 2017 in Germany, the disclosure of which is incorporated herein by reference in its entirety.

The disclosure relates to a valve.

BACKGROUND

A valve with a movable control spool is disclosed in the data sheet which has been able to be downloaded since Feb. 6, 2016 using the internet link http://www.boschrexroth-.com/various/utilities/mediadirectory/download/index.jsp?object_nr=R E64322. The position of the control spool is adjusted as a result of pressure being applied to two control spaces. Air, which disturbs the adjusting of the control spool, is able to accumulate in said control spaces as, unlike hydraulic oil, it is compressible. Vent screws, by way of which the air is able to be removed from the relevant control space, are consequently provided on the corresponding control covers.

SUMMARY

An advantage of the present disclosure consists in that the venting takes place automatically during normal operation of the valve. The control space, in this case, is completely vented. The valve is designed in a particularly simple and cost-efficient manner.

It is proposed that there is provided a connecting channel which opens out into an associated tank channel and into the sealing groove. In this connection, use is made of the fact that typically leakages are to be seen between the control space and the sealing groove. As a result, air is also conveyed out of the control space into the sealing groove, it being able to flow from there via the connecting channel to the tank. As, irrespective of the installation position of the valve, a point of the sealing groove is always arranged at the highest point with reference to the direction of gravity, complete venting of the relevant control space can be achieved.

The sealing groove is preferably arranged exclusively in the sealing surface. The sealing surface and the counter sealing surface are preferably realized in a level manner, it being extremely preferable for them to be aligned perpendicularly with respect to the longitudinal axis. The valve is used with a pressurized fluid which is preferably a liquid and extremely preferably hydraulic oil. In this case, attempts are made to ensure that the pressurized fluid is free of air pockets, such as, for example, air bubbles. The connecting channel can be associated with a tank channel which is arranged in the basic body, the connecting channel preferably running entirely in the basic body. However, it is also conceivable for the connecting channel to be associated with a tank channel which is arranged in the control cover, the connecting channel preferably running entirely in the associated control cover. A pilot valve, for example, which is installed on the relevant control cover, is connected to the above-named tank channel such that said tank channel forms a control oil return. The at least one tank channel is preferably connectable to a tank.

Advantageous further developments and improvements of the disclosure are provided in the description, claims, and drawings.

It can be provided that the connecting channel opens out radially inside the sealing ring into the sealing groove. Pressurized fluid which is mixed with air accumulates in a preferred manner in said region of the sealing groove as it is not able to flow radially past the sealing ring outside the sealing ring. As a consequence, there is a particularly good venting effect.

It can be provided that the connecting channel is realized in a circular cylindrical manner. The connecting channel can consequently be produced in a simple and cost-efficient manner by means of a drilling operation. The connecting channel preferably runs parallel to the longitudinal axis.

It can be provided that a tank channel is arranged in the basic body, wherein the named tank channel includes at least one first annular groove which surrounds the control spool, wherein a first annular groove is arranged adjacent to an associated control space, wherein the connecting channel opens out into the above-named first annular groove. The connecting channel can consequently be arranged at any arbitrary point on the circumference of the control spool, in every case opening out into the tank channel. It can consequently easily be arranged in such a manner that it does not cross any other fluid channel in the basic body. The adjacent annular groove, in this case, is to be understood as the annular groove which is at the smallest distance from the relevant control space.

It can be provided that a return spring is received in the control space, wherein the control space is delimited in portions in the control cover by a first recess which is realized in a rotationally symmetrical manner with reference to the longitudinal axis and is open toward the sealing surface, wherein said first recess is adapted to the return spring. The control spool is preferably adjusted into a central position by means of the return springs when none of the control spaces are acted upon with pressure. The return spring is preferably realized as a coil spring which is aligned concentrically with respect to the longitudinal axis. The first recess preferably has its greatest cross-sectional area with reference to the longitudinal axis in the region of the sealing surface.

It can be provided that the control space is delimited in portions in the control cover by at least one second recess which extends radially outwardly proceeding from the first recess at least in the region of the sealing surface, wherein it ends at a spacing from the sealing groove in such a manner that the smallest spacing between the second recess and the sealing groove is smaller than the smallest spacing between the first recess and the sealing groove. Consequently, the above-addressed leakages take place in a preferred manner in the region of the sealing surface in which the second recess is at the smallest spacing from the sealing groove. As a result, in particular the air which accumulates in the second recess is removed toward the sealing groove in a particularly reliable manner.

It can be provided that a second recess extends over the circumference of the first recess between 5° and 30°. As a result, an accumulation of air, which comprises particularly small transverse dimensions at predefined volumes, is formed in one of the second recesses. Said accumulation of air is situated, over and above this, in the vicinity of the point at which the largest leakage takes place such that the relevant air is removed into the sealing groove in a particularly effective manner.

It is possible to provide several second recesses which are arranged distributed in such a manner over the circumference of the first recess that they are spaced apart from one another. The result here is that, irrespective of the installation position, the air in the control space is collected in one of the second recesses.

It can be provided that the control space is delimited in portions in the control cover by a third recess which extends radially outwardly proceeding from the first recess, wherein the directional control valve includes a pilot valve which is connected to a control channel which opens out into the third recess away from the first recess. The control channel can be arranged in the basic body or in the relevant control cover. The third recess preferably complies with all the features of a second recess such that the third recess also contributes to the venting process.

It can be provided that the smallest spacing between the at least one second recess and the sealing groove in the region of the sealing surface is equal to the smallest spacing at that location between the third recess and the sealing groove. Consequently, the third recess complies with all the features of a second recess such that the third recess also contributes to the venting process.

It can be provided that the depth of the second recess, which is measured from the first recess radially with respect to the longitudinal axis, decreases continually proceeding from the sealing surface toward a bottom of the first recess. This results in the air in the region of the sealing surface accumulating in the second recess, that is to say precisely at the point where the leakage takes place, by way of which the venting procedure is accomplished.

It can be provided that the sealing groove comprises a constant width away from the connecting channel, wherein it comprises a radially inwardly pointing lateral bulge in the region of the connecting channel. The width of the sealing groove can consequently be adapted to the sealing ring in an optimal manner over a large part of its length. The connecting channel preferably opens out into the bulge.

It is obvious that the above-mentioned features and the features yet to be explained below are usable not only in the respectively specified combination, but also in other combinations or standing alone without departing from the framework of the present disclosure.

BRIEF DESCRIPTION OF THE DRAWINGS

The disclosure is explained in more detail below by way of the accompanying drawings, in which.

DETAILED DESCRIPTION

Figure 1:
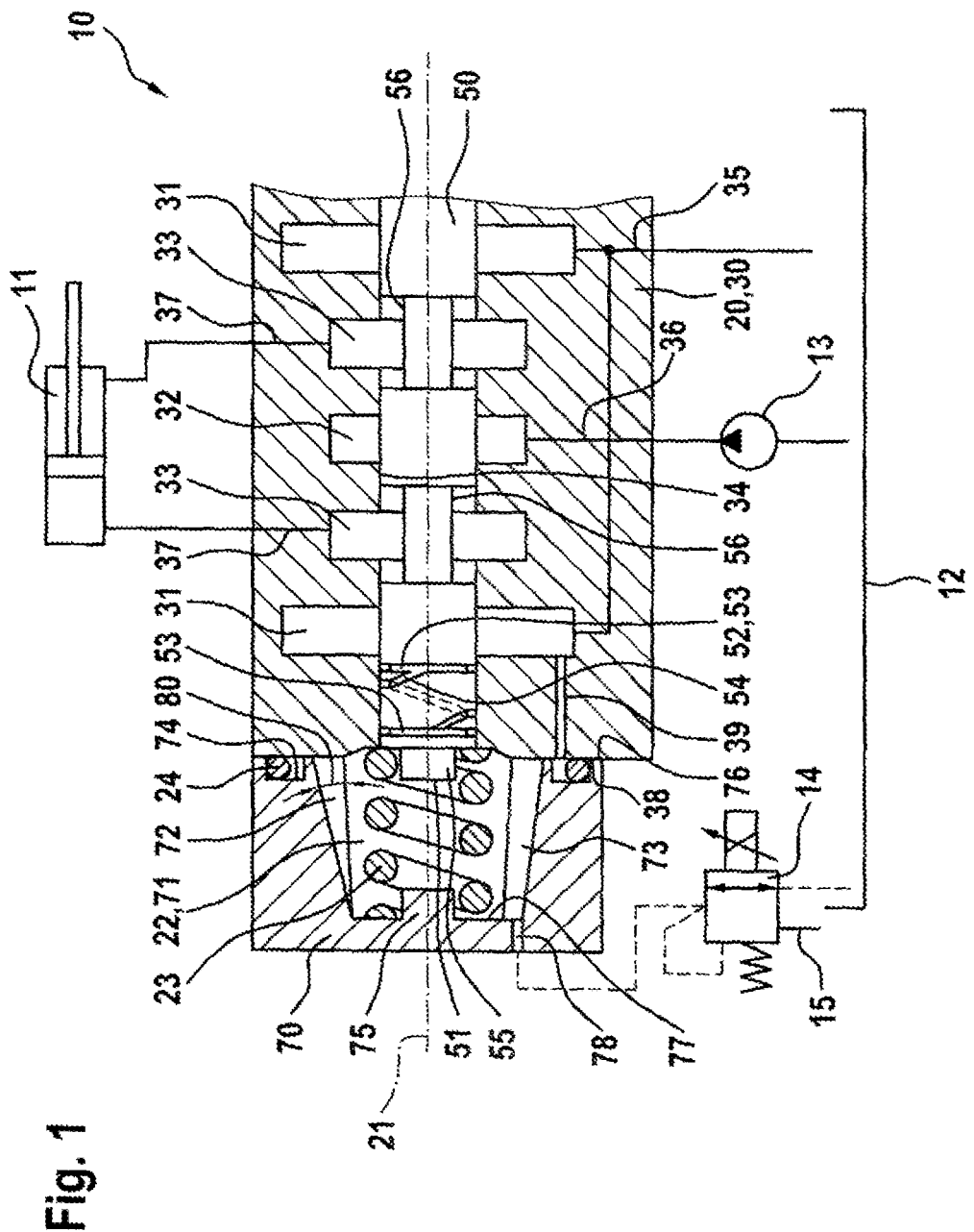
FIG. 1 shows a rough schematic longitudinal section of a valve according to the disclosure.
Figure 2:
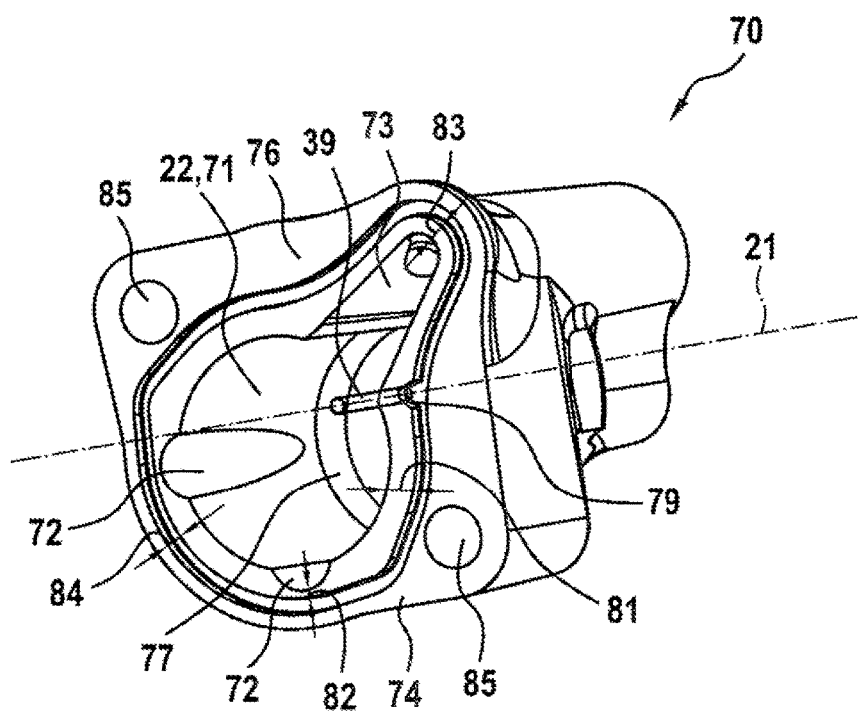
FIG. 2 shows a perspective view of a control cover from the sealing surface.

FIG. 1 shows a rough schematic longitudinal section of a valve 20 according to the disclosure which is a component part of a hydraulic drive system 10. The section plane runs through the longitudinal axis 21. The second and the third recesses 72; 73 and the connecting channel 39 are shown in the section plane for reasons of clarity. The actual positions thereof on the circumference of the longitudinal axis 21 are shown in FIG. 2.

The valve 20 includes a basic body 30 which is penetrated concentrically with respect to the longitudinal axis 21 by a circular cylindrical spool bore 34. A separate control spool 50 is received so as to be movable in the direction of the longitudinal axis 21 in the spool bore 34. Several annular grooves 31; 32; 33, which surround the control spool 50, are arranged in the basic body 20, being arranged side by side in the direction of the longitudinal axis 21. The position and the interconnection of the annular grooves 31; 32; 33 are chosen corresponding to the desired function of the valve 20. In the present case, a 4/3 directional control valve is shown. With the control spool 50 in the center position shown, the pump channel 36, the tank channel 35 and the two working channels 37 are blocked. When the control spool 50 is deflected out of the center position, a fluid connection is produced from the pump channel 36 to a working channel 37 and from the tank channel 35 to the respectively other working channel 37. An actuator 11, for example a hydraulic cylinder or a hydro motor, is connected to the working channels 37.

The center, second annular groove 32 is a component part of the pump channel 36 which is connected to a pump 13 which sucks in pressurized fluid out of a tank 12 and conveys it under pressure to the second annular groove 32. The pressurized fluid is preferably a liquid and extremely preferably hydraulic oil. The two third annular grooves 33 are arranged on oppositely situated sides of the second annular groove 32, being in each case component parts of an associated working channel 37. The two first annular grooves 31 are arranged on two oppositely situated sides of the remaining annular grooves 32; 33. They are component parts of a common tank channel 35, by means of which the two first annular grooves 31 are fluidically connected to the tank 12. In the region of the third annular grooves 33, the control spool 50 is provided with fourth annular grooves 56 which, depending on the position of the control spool 50, produce a fluid connection between two directly adjacent annular grooves 31; 32; 33.

The two end faces 51 of the control spool 50 which point in the direction of the longitudinal axis 21 delimit in each case an associated control space 22, the volume of which alters when the control spool 50 is moved. FIG. 1 only shows the left-hand control space 22, the oppositely situated control space including the venting according to the disclosure being realized in a mirror-symmetrical manner. Consequently, the control spool 50 can be moved as a result of pressure being applied to the control spaces 22. Each control space 22 is delimited in portions by a respectively associated control cover 70 which abuts by way of a sealing surface 76 against a counter sealing surface 38 on the basic body 30. The sealing surface 76 and the counter sealing surface 38 are realized in a level manner at least in the contact region, being aligned perpendicularly with respect to the longitudinal axis 21. In each case a return spring 23, which is realized as a coil spring, is received in the control space 22. The return spring 23 is held in a positive locking manner transversely with respect to the longitudinal axis 21 by two centering pins 75; 55, which are arranged on the bottom 77 of the first recess 71 and on the control spool 50. The return spring 23 is supported in the direction of the longitudinal axis 21 on the bottom 77 of the first recess 71 and in the opposite direction on the control spool 50 or on the basic body 30. The return spring 23 abuts against both the control spool 50 and the basic body 30 purely when the control spool 50 is in the center position shown in FIG. 1. Consequently, the control spool 50 is moved into the named center position by the return springs 23 when the control spaces 22 are not acted upon with pressure.

Two measures which are effective separately from one another, individually, have been taken for venting the control spaces 22 in the present case. First of all, the control spool 50 has been provided with flushing grooves 52 between the control spaces 22 and the respectively associated first annular groove 31. The free cross-sectional area of the flushing grooves 52 is shown in a greatly exaggerated manner in FIG. 1. It is actually chosen to be small in such a manner that a defined, small volume flow flows through the flushing grooves 52 from the control space 22 to the associated first annular groove 31. In this connection, use is made of the fact that between the spool bore 34 and the control spool 50 there is present a minimum clearance which is due to the mobility of the control spool 50. Fluid leakages, which are increased in a targeted manner by the flushing groove 52, are produced as a result. Each flushing groove 52 includes two portions 53, which extend in a circular-ring-shaped manner about the control spool 50 and are arranged at a slight spacing from the control space 22 or rather from the first annular groove 31 in the center position. The two ring-shaped portions 53 are connected together fluidically by means of a portion 54 which extends in a helical manner about the control spool 50.

The pressurized fluid, which drains out of the control space 22 via the flushing groove 52, also always entrains a little air with it such that the control space 22 is continuously vented. In this connection, however, the problem arises that, with reference to the direction of gravity, air is able to accumulate in the control space 22 above the spool bore 34 and said air is not able to be removed or can only be removed in part out of the control space 22 as a result of the above-described venting. This is to be traced back to the fact that the first recess 71 of the control cover 22, which is adapted to the return spring 23, comprises a larger diameter than the spool bore 34. A second venting path, which runs via the sealing groove 74, is provided in order to redress said problem.

The sealing groove 74, in the present case, is arranged in the sealing surface 76 on the control cover 70, it being possible for it to be arranged in part or entirely in the counter sealing surface 38 on the basic body 30. The sealing groove 74 runs around the control space 22 in the form of a closed ring. A separate sealing ring 24, which consists of an elastomer, is received in the sealing groove 74. The sealing ring 24 is installed under preload in such a manner that no pressurized fluid is able to flow past the sealing ring 24 and out of the valve 20 to the outside. Along with the first recess 71, the control space 22 is delimited by several second recesses 72 which, proceeding from the first recess 21, extend radially outwardly. The second recesses 72 extend in each case only over part of the circumference of the control space 22, being arranged distributed over the circumference of the control space 22. Their depth 80 is greatest in the region of the sealing surface 76, decreasing toward the bottom 77 of the first recess 71. The second recesses 72 are developed such that the highest point of the control space 22, with reference to gravity, is formed substantially just by them, quite irrespective of the rotational position in which the valve 20, with reference to the longitudinal axis 21, is installed. Consequently, the air accumulates in one of the second recesses 72 or in the third recess 73 which is developed in a similar manner to the second recesses 72.

The smallest spacing (No. 82; 83 in FIG. 2) between the sealing groove 74 and the second or rather third recess 72; 73 is designed to be small in such a manner that a small amount of pressurized fluid penetrates there when the control space 22 is acted upon with pressure. Said pressurized fluid consequently passes into the sealing groove 74, flowing along the circumference thereof until it reaches the connecting channel 39. The connecting channel 39 is arranged in the basic body 30, being realized in the form of a circular cylindrical bore which is aligned parallel to the longitudinal axis 21. The connecting channel 39 opens out radially inside the sealing ring 24, that is to say at the point where the above-explained pressurized fluid is situated, into the sealing groove 74. In addition, the connecting channel 39 opens out into the first annular groove 31 which is at the smallest spacing from the relevant control space 22. Consequently, the pressurized fluid is able to drain out of the sealing groove 74 toward the tank 12. Said pressurized fluid entrains, as necessary, air enclosed in the control space 22 such that said control space is vented. As the corresponding flow path, irrespective of the installation position of the valve 20, runs over the highest point of the control space 22 with reference to the direction of gravity, it is ensured that all the air or, as necessary, the air present in the control space 22 is conveyed toward the tank 12. It is obvious that the corresponding volume flow is small such that the adjustment of the control spool 50 is not disturbed in a substantial manner.

The third recess 73 serves for connecting a pilot valve 14 to the control space 22. The pressure in the control space 22 is adjusted using the pilot valve 14, which in the present case is realized as a 3-way pressure reduction valve. Within the framework of pressure regulation, the pilot valve 14 produces a connection to a control pressure source 15 and the tank 12 as an option. The control channel 78 in the control cover 70, to which the pilot valve 14 is connected, opens out into the third recess 73, in the present case in the region of the bottom 77 of the first recess 71. The depth of the third recess 73 is increased accordingly in relation to the depth 80 of the second recess 72. So that the venting effect, which has been described above for the second recess, also occurs at the third recess 73, the depth of the third recess 73 decreases from the sealing surface 76 toward the bottom 77.

The pressure control valve 14 is preferably realized as a screw-in valve which is installed in the basic body 30 or in one of the control covers 74. In this case, the two pilot valves 14 shown in FIG. 1 can be integrated into one single valve, which is realized, for example, according to DE 10 2012 222 399 A1.

FIG. 2 shows a perspective view of a control cover 70 from the sealing surface 76. The sealing surface 76 is realized in a level manner, it being aligned perpendicularly with respect to the longitudinal axis 21. The sealing groove 74, which surrounds the control space 22 in a ring-like manner, is arranged inside the sealing surface 76. Away from the connecting channel 39, the sealing groove 74 has a constant, rectangular cross-sectional form which is adapted to the sealing ring (No. 24 in FIG. 1). To clarify the position of the connecting channel 39, it is shown in FIG. 2 as a circular cylinder although it is actually a circular cylindrical bore in the basic body (No. 30 in FIG. 1). The connecting channel 39 opens out into the sealing groove 74 between a second recess 72 and the third recess 73. The sealing groove 74 is widened for this purpose radially inwardly by means of a bulge 79, the connecting channel 39 opening out into the bulge 79. The connecting channel 39, accordingly, opens out radially inside the sealing ring (No. 24 in FIG. 1) into the sealing groove 74.

Two fastening bores 85, which are penetrated in each case by a threaded bolt (not shown) which is screwed into the basic body, are arranged radially outside the sealing groove 74. The fastening bores 85 are arranged at a spacing from the points 82, 83 at which the sealing groove 74 is at the smallest spacing from the second or rather third recess 72; 73. The pressure in the control space 22 consequently causes the sealing surface 76 to lift up in a minimal manner from the counter sealing surface (No. 38 in FIG. 1) in particular at said points 82; 83 such that the already addressed fluid flow occurs from the control space 22 into the sealing groove 74.

As the sealing groove 74 is connected fluidically to the tank, a small amount of pressure at most can be built up in the sealing groove 74. Any elastic deformation of the control cover 70 outside the sealing groove 74 is compensated for by the sealing ring (No. 24 in FIG. 1).

The first recess 71 in the control cover 70 is realized in a substantially circular cylindrical manner with reference to the longitudinal axis 21, the diameter thereof decreasing in a minimal manner toward the bottom 77 proceeding from the sealing surface 76. The two second recesses 72 and the third recess extend radially outwardly proceeding from the first recess 71. Their spacing in the circumferential direction is approximately 120° such that they are arranged distributed in a uniform manner over the circumference of the first recess 71. Their circumferential width is approximately 20°. The depth (No. 80 in FIG. 1) of the second and of the third recess 72; 73 decreases toward the bottom 77 proceeding from the sealing surface 76, the depth of the second recesses 72 being clearly shallower than the depth of the third recess 73. The second recesses 72 are realized in a part-circle manner when viewed in cross section. The third recess 73 is realized in a V-shaped manner with a rounded bottom when viewed in cross section.

LIST OF REFERENCES

10 Hydraulic drive system
11 Actuator
12 Tank
13 Pump
14 Pilot valve
15 Control pressure source
20 Valve
21 Longitudinal axis
22 Control space
23 Return spring
24 Sealing ring
30 Basic body
31 First annular groove
32 Second annular groove
33 Third annular groove
34 Spool bore
35 Tank channel
36 Pump channel
37 Working channel
38 Counter sealing surface
39 Connecting channel
50 Control spool
51 End face
52 Flushing groove
53 Ring-shaped portion of the flushing groove
54 Helical portion of the flushing groove
55 Centering pin
56 Fourth annular groove
70 Control cover
71 First recess
72 Second recess
73 Third recess
74 Sealing groove
75 Centering pin
76 Sealing surface
77 Bottom of the first recess
78 Control channel
79 Bulge
80 Depth of the second recess
81 Smallest spacing between first recess and sealing groove
82 Smallest spacing between second recess and sealing groove
83 Smallest spacing between third recess and sealing groove
84 Width of the sealing groove
85 Fastening bore

What is claimed is:

1. A valve, comprising:
    a basic body including:
        a counter-sealing surface;
        a tank channel; and
        a connecting channel that opens out into the tank channel;
    a control spool received in the basic body so as to be movable in a direction of a longitudinal axis, and including at least one end face facing in the direction of the longitudinal axis;
    a control cover that, together with the at least one end face of the control spool, at least partially delimits a control space;
        the control cover including a sealing surface in abutment with the counter-sealing surface of the basic body; and
        at least one of the sealing surface of the control cover and the counter-sealing surface of the basic body including a sealing groove surrounding the control space in ring-like fashion; and
    a sealing ring received in the sealing groove, wherein the connecting channel further opens out into the sealing groove.

2. The valve of claim 1, wherein the connecting channel opens out into the sealing groove radially inside of the sealing ring.

3. The valve of claim 1, wherein the connecting channel has a circular cylindrical shape.

4. The valve of claim 1, wherein:
    the tank channel includes at least one first annular groove surrounding the control spool and adjacent to the control space; and
    the connecting channel opens out into the at least one first annular groove.

5. The valve of claim 1, further comprising
    a return spring received in the control space, wherein:
        the control cover includes a first recess that is rotationally symmetrical about the longitudinal axis, and that is open toward the sealing surface;
        the first recess at least partially delimits the control space; and
        the first recess is adapted to the return spring.

6. The valve according to claim 5, wherein the control cover further includes a second recess that at least partially delimits the control space, and that extends radially outwardly from the first recess at a region of the sealing surface to a location spaced apart from the sealing groove, such that a smallest spacing between the second recess and the sealing groove is smaller than a smallest spacing between the first recess and the sealing groove.

7. The valve according to claim 6, wherein the second recess extends over an angular range of a circumference of the first recess between 5° and 30°.

8. The valve according to claim 6, wherein the control cover further includes at least one further second recess such that a plurality of second recesses are distributed over a circumference of the first recess and are spaced apart from each other.

9. The valve according to claim 6, further comprising a pilot valve;
    wherein the control cover further includes:

a third recess that at least partially delimits the control space, and that extends radially outwardly from the first recess; and a control channel that opens out into the third recess away from the first recess; the pilot valve connected to the control channel.

10. The valve according to claim 9, wherein a smallest spacing between the second recess and the sealing groove in a region of the sealing surface is equal to a smallest spacing between the third region and the sealing groove in the region of the sealing surface.

11. The valve according to claim 6, wherein a depth of the second recess, measured radially relative to the longitudinal axis from the first recess, continually decreases toward a bottom of the first recess proceeding from the sealing surface.

12. The valve of claim 1, wherein the sealing groove has a shape with a constant width in a region away from the connecting channel, and has a radially inwardly facing lateral bulge in a region of the connecting channel.

* * * * *